US 6,556,135 B2

(12) United States Patent
Attring et al.

(10) Patent No.: US 6,556,135 B2
(45) Date of Patent: Apr. 29, 2003

(54) SYSTEM FOR INDICATING STATUS OF A VEHICLE

(76) Inventors: Jan Attring, Linneplatsen 6, 41310 Gothenburg (SE); Markus Valter Witte, Grona Gatan 39, 405 54 Gothenburg (SE); Mats Petersson, Norra Krokslattsgaan 12, 412 64 Gteborg (SE)

(*) Notice: Subject to any disclaimer, the term of this patent is extended or adjusted under 35 U.S.C. 154(b) by 0 days.

(21) Appl. No.: 10/022,493

(22) Filed: Dec. 17, 2001

(65) Prior Publication Data

US 2002/0109587 A1 Aug. 15, 2002

(51) Int. Cl.[7] ................................................ G08B 1/08
(52) U.S. Cl. ................... 340/539; 340/425.5; 340/426; 307/10.1
(58) Field of Search .............................. 340/425.5, 426, 340/539; 307/10.1

(56) References Cited

U.S. PATENT DOCUMENTS

| 5,475,366 A | * | 12/1995 | Van Lente et al. | ........... 340/525 |
| 5,583,485 A | * | 12/1996 | Van Lente et al. | ........... 340/525 |
| 5,614,885 A | * | 3/1997 | Van Lente et al. | ........... 340/525 |
| 5,661,455 A | * | 8/1997 | Van Lente et al. | ........... 340/525 |
| 5,691,848 A | * | 11/1997 | Van Lente et al. | ........... 359/601 |
| 5,699,044 A | * | 12/1997 | Van Lente et al. | ........... 340/525 |
| 5,708,415 A | * | 1/1998 | Van Lente et al. | ........... 340/525 |
| 5,864,297 A | * | 1/1999 | Sollestre et al. | ............ 340/523 |
| 6,172,430 B1 | * | 1/2001 | Schmitz et al. | ............ 307/10.2 |
| 6,243,022 B1 | * | 6/2001 | Furukawa | .............. 340/825.72 |

* cited by examiner

Primary Examiner—Daryl Pope

(57) ABSTRACT

This invention relates to a system for indicating status of a vehicle, comprising a monitoring unit (1), positioned within the vehicle, comprising a first memory circuit (4) connected with a first transceiver (3). The monitoring unit (1) is arranged to monitor a selected set of parameters (22) in the vehicle (2), whereby the current status (22a) of each parameter in said set of parameters (22) is detected and stored in said first memory circuit (4). The system further comprises a portable fob unit (7) having a second transceiver (9). The transceivers (3,9) are arranged to establish a short-distance wireless communication link (8) between said fob unit (7) and monitoring unit (1) when within a communication range from each other. The system further comprises a register (23) arranged to store a preferred or pre-set status (22b) of each parameter in said set of parameters (22), and a comparator (25). The comparator (25) is arranged to compare the contents of said first memory unit (4) and the register (23), and output an alert signal (F) if the status of any parameter in the monitored set of parameters (22) differs from its preferred or pre-set status (24) as stored in said register (23). The alert signal (F) is finally transmittable to an alert device (28) in said fob unit (7).

11 Claims, 2 Drawing Sheets

SYSTEM FOR INDICATING STATUS OF A VEHICLE

TECHNICAL FIELD OF THE INVENTION

The present invention relates to a system for indicating status of a vehicle.

BACKGROUND ART

There is today a growing awareness of safety risks when using vehicles. For example, many different constructions regarding vehicle alarms are known. Most of these systems generate a warning signal at the time of for example a burglary with the purpose of drawing attention to the vehicle and thereby scare off a burglar, or notifying an alarm central directly, e.g. over a cellular network. However, most of those systems are only effective for a short time after the burglary, and does not give notice to the vehicle owner or user. This may enable a burglar to hide in or around a vehicle and thereby the vehicle user is put in a dangerous position if he approaches the vehicle, not knowing about the burglary.

Further, many other potentially dangerous, harmful or inexpedient situations may occur in and around a vehicle. For example, a burglar may have stolen gasoline from the vehicle, soiling the surrounding area, or a dog may have been left in a vehicle, that is too hot, risking the health of the dog.

The object of the present invention is therefore to provide a system for alerting a user of a vehicle about potentially dangerous, harmful or inexpedient situations as he approaches or leaves the vehicle or, alternatively, exits or enters the vehicle.

A further object of the invention is to provide a flexible system that may be used in numerous different applications.

SUMMARY OF THE INVENTION

These and other objects are achieved by a system for indicating status of a vehicle, said system comprising a monitoring unit, positioned within the vehicle, comprising a first memory circuit connected with a first transceiver, said monitoring unit being arranged to monitor a selected set of parameters in the vehicle, whereby the current status of each parameter in said set of parameters is detected and stored in said first memory circuit; and a portable fob unit having a second transceiver; said transceivers being arranged to establish a short-distance wireless communication link between said fob unit and monitoring unit when within a communication range from each other, said system further comprising a register arranged to store a preferred or pre-set status of each parameter in said set of parameters, and a comparator, wherein the comparator is arranged to compare the contents of said first memory unit and the register, and output an alert signal if the status of any parameter in the monitored set of parameters differs from its preferred or pre-set status as stored in said register, said alert signal being transmittable to an alert device in said fob unit. With a system in accordance with the invention it is possible to check the status of a number of parameters in the vehicle from a distance, when approaching or leaving the vehicle. For example, an alert signal may be transmitted to the alert device if a vehicle door has been broken open or a window has been smashed during the time when the user has been away from the vehicle, thereby giving the user the possibility of being extra cautious when approaching the vehicle. When leaving the vehicle the system may be used to alert a user if for example a dog or baby has been left in the car of if a vehicle door is open.

Preferably, the comparator is arranged to compare the contents of said first memory unit and the register when receiving a trigger signal generated in a trigger device. By letting the comparison be trigged by a trigger signal instead of be executed constantly, computational power may be saved.

In accordance with a preferred embodiment of the invention, said trigger signal is arranged to be generated in said trigger device when a locking or unlocking signal is transmitted from the fob unit to the vehicle, to lock/unlock at least one vehicle door. Thereby, said status poll is done automatically when the user locks or unlocks the vehicle. The locking/unlocking signal device is further commonly integrated with a fob unit, resulting in the possibility for one unit for unlocking/locking and status poll of a vehicle. Further, by connecting the status poll to the locking and unlocking of the car, alteration information reaches the user at a time when he is much interested in this information, namely when approaching or leaving the vehicle.

In accordance with a second embodiment of the invention, said trigger signal is arranged to be generated in said trigger device when an enter or exit signal, indicating that the fob unit is moved between a position inside the vehicle and a position outside a vehicle, reaches said trigger device. In this case the fob may include a transponder, and the vehicle may include a system for tracking the fob in order to determine whether the fob is positioned in or outside the vehicle body. Such a system may be referred to as a passive entry system, and will not be described in closer detail herein. However, this construction enables said status poll to be done automatically when the user/fob exits or enters the vehicle.

Preferably, said register and said comparator is located in said monitoring unit, and said alert signal is arranged to be transferred over said communication link to said fob unit. With this construction, placing most major components of the system in the monitoring unit, the portable fob unit may be made smaller, and since only the alert signal, and not the entire content of the first memory circuit, is transmitted to the fob, the transmission may be very fast.

Further said alert signal suitably comprises a difference identity signal, unique for essentially each possible parameter difference, making identification of an occurred alteration of a vehicle parameter possible in said fob. Thereby, by including decoding information in the fob, full information regarding parameter alterations in the vehicle may be accessed from the fob, without transmitting the entire content of the first memory circuit to the fob.

Preferably, said alert device comprises a display for displaying information regarding parameter differences. This information may be taken from the second register or more or less directly from the communication channel. The display enables a user to access information regarding at least parameter alterations in the vehicle.

Suitably, the fob unit further comprises a second memory circuit, whereby the parameters stored in the first memory circuit are arranged to be transmitted over said communication link to said second memory circuit, when the alert signal has been sent to the fob unit, at least in a case when a locking signal or an exit signal has been transmitted to the vehicle from the fob unit. This enables a user to have access to the status of vehicle parameters, as they were when the user locked and left the vehicle or exited the vehicle. This status information may for example by displayed on demand on the display described above. Thereby a user may gain information for example regarding the current gasoline level of the vehicle when away from the vehicle.

Preferably, said monitoring unit is connected with at least one vehicle data network, such as a controller area network, within said vehicle. Thereby the monitoring unit may easily access a large number of electrically controlled features within the vehicle. Furthermore, said monitoring unit suitably comprises a programmable selector, for selecting parameters from said vehicle data network. This programmable means gives the system manufacturer and/or the system user the possibility to choose what parameters should be polled or detected and when the system should send an alert to the user about an uncertain condition.

Finally, at least one parameter stored in said first register having a changeable preferred or pre-set status, such as the gasoline level of the vehicle, is preferably arranged to be automatically updated with the current status as stored in the first memory circuit, when an alert signal has been transmitted. By updating the status of changeable parameters in the register each time an alert signal has been transmitted brings the system up to date. For example, if gasoline has been stolen from the vehicle, this is first reported to the user by means of the alert signal, and thereafter the new gasoline level is recorded in the register of preferred or pre-set statuses.

BRIEF DESCRIPTION OF THE DRAWINGS

A currently preferred embodiment of the present invention will now be described in closer detail, with reference to the accompanying drawings.

DETAILED DESCRIPTION OF PREFERRED EMBODIMENTS OF THE INVENTION

The embodiment of the invention, which will be described in the following, is related to a system for indicating the status of a number of parameters of a vehicle when leaving or approaching the vehicle.

Figure 1:
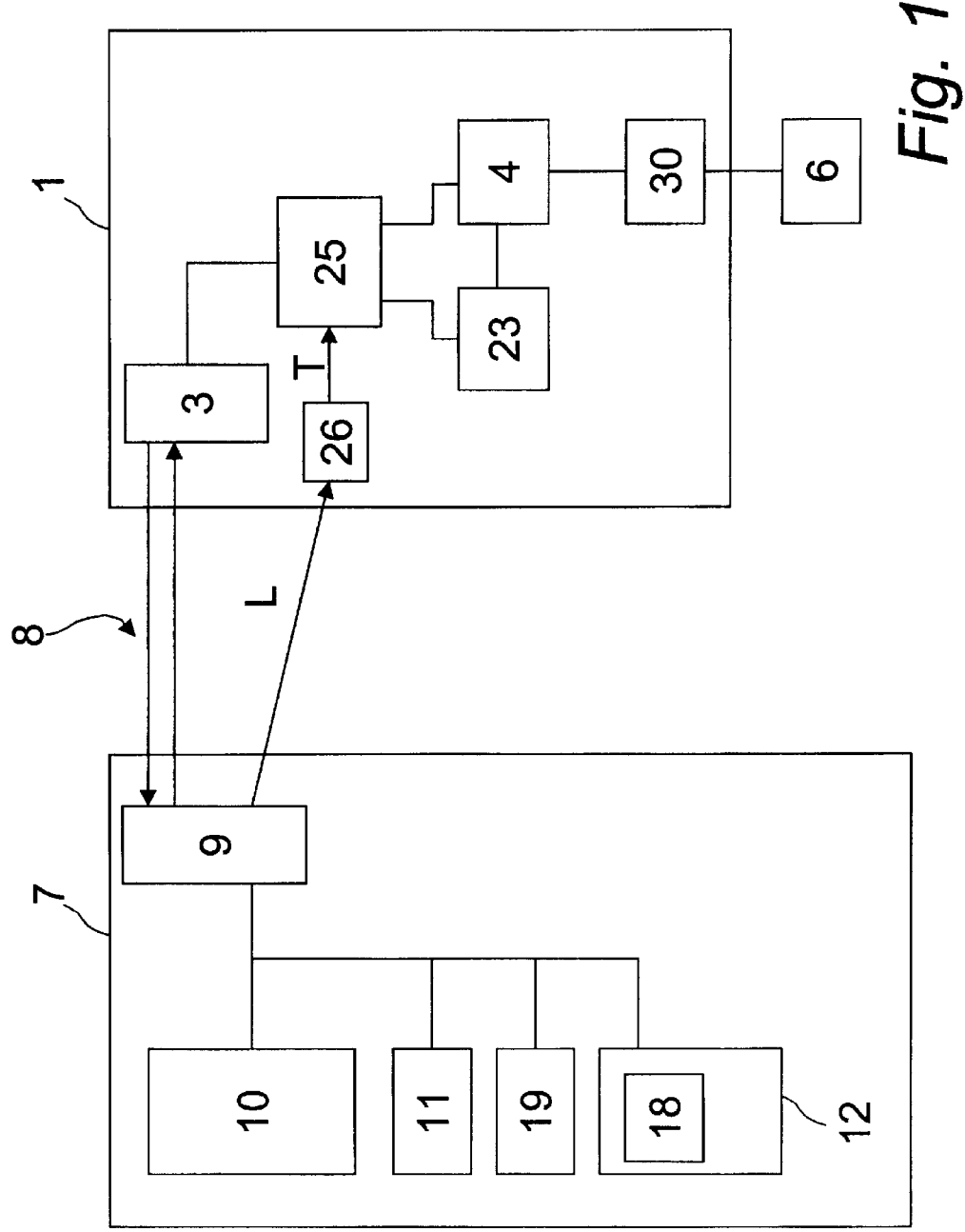
FIG. 1 is a schematic view of a system in accordance with the invention.
Figure 2:
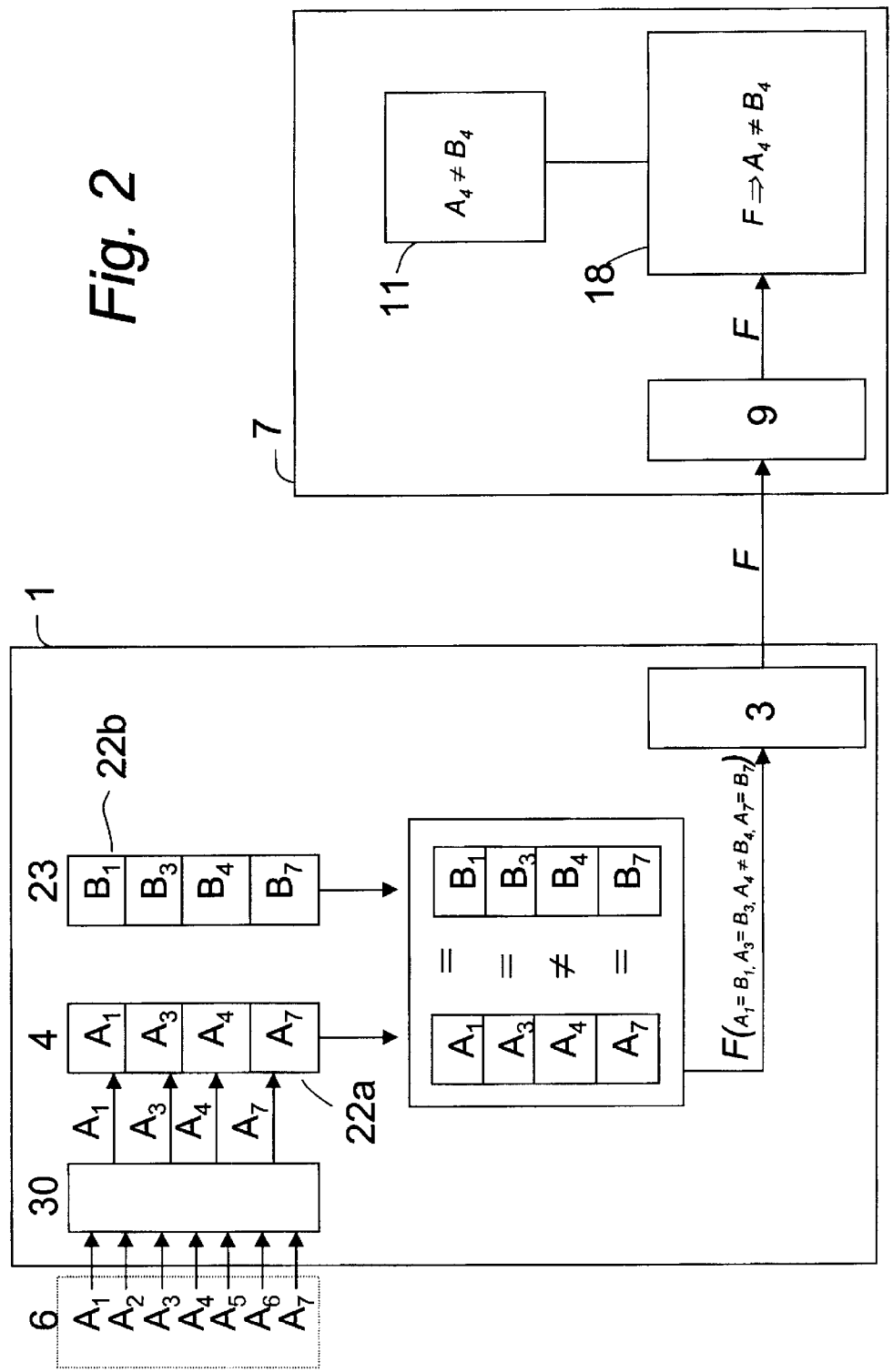
FIG. 2 is a schematic view of one exemplifying embodiment of the invention.

Referring now to FIG. 1, the system comprises a monitoring unit 1, located within a vehicle (not shown). The monitoring unit 1 comprises a first transceiver 3 for wireless communication and is connected to a vehicle data network 6, in this case a control area network within the vehicle. The monitoring unit further comprises a first memory circuit 4, connected with said vehicle data network 6 via a programmable selector 30. By the connection with the vehicle data network 6 virtually all electrically measured features (as schematically shown in FIG. 2 as $A_1-A_7$) within said vehicle are available to the monitoring unit 1. Said selector 30 is arranged to select a number of features or parameters, accessible over the vehicle data network 6, for storing in the first memory circuit 4. Consequently, a set of selected parameters (as schematically shown in FIG. 2 as $A_1, A_3, A_4$ and $A_7$, hereinafter referred to as 22a) may be stored in said memory circuit 4. Since the status or value of each of these parameters may be regularly monitored over the vehicle data network, this set of parameters may be referred to as a monitored set of parameters. The above-described parameters may for example be the status of each vehicle door (open or closed), heartbeat found within the vehicle, gasoline level, window status (open or closed) etc.

The monitoring unit also includes a first register 23. This register 23 is arranged to comprise preferred/pre-set values for each of the above-mentioned set of parameters, together constituting a preferred set of parameters, as shown in FIG. 2 as $B_1, B_3, B_4$ and $B_7$, hereinafter referred to as 22b. In order to coordinate what parameters should be monitored, the register 23 may also be connected with said selector 30 (connection not shown).

Both the first memory circuit 4 and the register 23 are connected with a comparator 25, to which the content of the first memory circuit 4 and the register 23 may be transferred and in which the corresponding parameter statuses in the first memory circuit 4 and the register 23, respectively, may be compared. If any parameter in the monitored set of parameters 22a have a value or status that is different from the preferred status as stored in the preferred set of parameters 22b, an alert signal F is outputted from the comparator 25 and transmitted to the first transceiver 3, in this case being a standard Bluetooth circuit. In this case, the generated alert signal F is uniquely dependent upon the occurred difference between the monitored set of parameters 22a and the preferred set of parameters 22b, as schematically shown in FIG. 2 as $F(A_1=B_1, A_3=B_3, A_4 \neq B_4, A_7=B_7)$. Thereby the alert signal F is decodable, in order to regain information about occurred differences between said sets of parameters 22a, 22b.

The system further comprises a portable fob unit 7, having a second transceiver 9 for wireless communication, being compatible with said first transceiver 3, and a second memory circuit 10. The second memory circuit 10 is connected to said second transceiver 9, in this case being a standard Bluetooth circuit. Further, the fob unit is equipped with an alert device 28, here in the form of a display 11, for displaying information stored in said second memory circuit 10 and a processor 12 for processing information stored in said second memory circuit 10 or obtained directly from the second transceiver 9. The fob unit 7 further comprises a battery 19 or the like, for providing power to the components of the fob unit 7. Moreover, the fob unit comprises a second register 18, here included in said processor 12 with decoding difference information for said alert signal F. The decoded information is thereafter transmitted to the display 11 Thereby, full information about occurred differences in the vehicle may be obtained from the fob 7.

Said first and second Bluetooth transceivers 3, 9 are connectable with each other when said transceivers are within a short/medium distance from each other (in the Bluetooth case<100 m), thereby establishing a communication link 8 between the fob unit 7 and the monitoring unit 1 located within the vehicle 2. The establishment of this communication link 8 is in this case performed in accordance with the Bluetooth standard, and will not be described herein. However, it should be mentioned that each Bluetooth circuit is equipped with a special identification code, being unique for each circuit. This identification code enables a transceiver to establish a connection with one chosen other transceiver within the communication range. Further, in accordance with a preferred embodiment, each vehicle is provided with several associated fob units. In this case, each fob unit has a special fob ranking, whereby the fob with the highest ranking is arranged to override other fobs if two or several fobs are trying to give contradicting orders to the monitoring unit 1.

In this embodiment of the invention, the comparison of said sets of parameters 22a, 22b is connected with the locking or unlocking of the vehicle. A locking/unlocking device (not shown) is on per se known manner integrated in said fob unit 7. When a locking/unlocking signal L is sent to the vehicle for locking/unlocking the doors of the vehicle, a part of this signal is also transmitted to a trigger device 26 for the generation of a trigger signal T. This trigger signal T is thereafter transmitted to the comparator 25, where it triggers the execution of a comparison operation. Further, locking/unlocking signal L may be sent over the second transceiver 9, as shown in FIG. 1, or over a separate transmission channel (not shown).

The above described parameters in said sets of parameters 22a, 22b may basically be divided into two different groups, parameters having a preferred status or value, such as vehicle door status (preferred: closed) or window status (preferred: closed), and parameters having a changeable preferred value, such as the gasoline level. In the first case, a constantly preferred value may be programmed into the first register 23. However, in the second case, the preferred value is changeable, and must therefor be updated regularly. In this case, the current value of such a parameter, as stored in the first memory circuit 4, is automatically transmitted to the corresponding position in the register 23, after the transmission of the alert signal has been completed. Consequently, a user will first be informed about the change of such a parameter, and thereafter the new value/status will replace the old one in the first register 23.

Further, the parameters stored in the first memory circuit 4 is transferred over said communication link 8 to the above mentioned second memory circuit 10 in the fob unit 7, when the alert signal F has been sent to the fob unit 7, when a locking signal 31 has been transmitted to the vehicle 2 from the fob unit 7. Thereby the parameter information is available to the user when away from the vehicle, and the information may be displayed on said display 11. Consequently, the user may easily check whether he closed the door or check the gasoline level, as it was when the user left the vehicle.

By means of said second transceiver, said fob unit may also be connected with other communication units, such as a personal computer 13, a cellular telephone 14, a hand held computer or other on market products. By establishing a two-way communication link between for example a computer 13 and the fob unit 7, an information item may be transferred between the computer and the fob. This enables a user to personalize a vehicle by loading information regarding for example travel plans, personal setting, road maps etc into the fob, whereby the information item may be transmitted to the vehicle as soon as the fob unit and the vehicle are within communication range from each other.

By using standard transceivers, such as Bluetooth circuits, the fob may easily be adapted for use in various other applications. For example the fob unit may be programmed to function as a remote garage door opener. Further, said second transceiver 9 of the fob unit 7 may be connected with a corresponding Bluetooth transceiver 21 in a cellular terminal 14 via a wireless communication link 20. By doing this, the fob may be used to establish a long-distance, secure communication between the fob and the vehicle, thereby enabling remote poll and control.

The present invention should not be considered as being limited to the above-described embodiment, but rather includes all possible variations covered by the scope defined by the appended claims. For example, in the above-described embodiment, the comparison is executed within the vehicle. However, it is possible to first transfer measured parameter information to the fob, and thereafter compare this information with preferred parameter values stored in the fob unit. It shall also be noted that the alert device, herein being described as a display on the fob, for some applications may be replaced with a vibrator, a light emitting diode or the like. If desired, a set of parameters may further comprise one and only one parameter. It shall also be noted that the trigger device may be arranged to generate a trigger signal based on various actions taking place in or within a vehicle. The above described embodiment uses an locking/unlocking signal for generating the trigger signal, but it is also possible to use an enter/exit signal from a passive entry system as described above. Other means for generating said trigger signal are possible.

What is claimed is:

1. A system for indicating status of a vehicle, comprising:

a monitoring unit, positioned within the vehicle, comprising a first memory circuit connected with a first transceiver, said monitoring unit being arranged to monitor a selected set of parameters in the vehicle, whereby the current status of each parameter in said set of parameters is regularly detected and stored in said first memory circuit; and a portable fob unit having a second transceiver;

said transceivers being arranged to establish a short-distance wireless communication link between said fob unit and monitoring unit when within a communication range from each other, said system further comprising a first register arranged to store a preferred or pre-set status of each parameter in said set of parameters, and a comparator, wherein the comparator is arranged to compare the contents of said first memory unit and the first register, and output an alert signal if the status of any parameter in the monitored set of parameters differs from its preferred or pre-set status as stored in said register, said alert signal being transmittable to an alert device in said fob unit.

2. A system according to claim 1, wherein the comparator is arranged to compare the contents of said first memory unit and the first register when receiving a trigger signal generated in a trigger device.

3. A system according to claim 2, wherein said trigger signal is arranged to be generated in said trigger device when a locking or unlocking signal is transmitted from the fob unit to the vehicle, to lock/unlock at least one vehicle door.

4. A system according to claim 2, wherein said trigger signal is arranged to be generated in said trigger device when an enter or exit signal, indicating that the fob unit is moved between a position inside the vehicle and a position outside a vehicle, reaches said trigger device.

5. A system according to claim 1, wherein said first register and said comparator is located in said monitoring unit, and said alert signal is arranged to be transferred over said communication link to said fob unit.

6. A system according to claim 5, wherein said alert signal comprises a difference identity signal, unique for essentially each possible parameter status difference, making identification of an occurred alteration of a vehicle parameter possible in said fob.

7. A system according to claim 1, wherein said alert device comprises a display for displaying information regarding parameter differences.

8. A system according to claim 3, wherein the fob unit further comprises a second memory circuit, whereby the parameters stored in the first memory circuit are arranged to be transmitted over said communication link to said second memory circuit, when the alert signal has been sent to the fob unit, at least in a case when a locking signal or an exit signal has been transmitted to the vehicle from the fob unit.

9. A system according to claim 1, wherein said monitoring unit is connected with at least one vehicle data network, such as a controller area network, within said vehicle.

10. A system according to claim 9, wherein said monitoring unit further comprises a programmable selector, for selecting parameters from said vehicle data network.

11. A system according to claim 1, wherein at least one parameter stored in said first register having a changeable preferred or pre-set status, such as the gasoline level of the vehicle, is arranged to be automatically updated with the current status as stored in the first memory circuit, when an alert signal has been transmitted.

* * * * *